(12) United States Patent
Sujan

(10) Patent No.: US 9,187,093 B1
(45) Date of Patent: Nov. 17, 2015

(54) SYSTEMS AND METHODS OF CRUISE DROOP CONTROL

(71) Applicant: Cummins, Inc., Columbus, IN (US)

(72) Inventor: Vivek A. Sujan, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 0 days.

(21) Appl. No.: 14/450,937

(22) Filed: Aug. 4, 2014

(51) Int. Cl.
*B60W 30/14* (2006.01)

(52) U.S. Cl.
CPC ..................... *B60W 30/14* (2013.01)

(58) Field of Classification Search
CPC ......... B60K 31/047; B60W 2550/142; B60W 30/14; F02D 31/007; F02D 41/1401; F02D 41/16; F02D 2041/1418; F02D 2041/1409; F02D 2041/141; F02D 31/00
See application file for complete search history.

(56) References Cited

U.S. PATENT DOCUMENTS

| | | | |
|---|---|---|---|
| 4,899,280 | A | 2/1990 | Onari et al. |
| 6,196,188 | B1 * | 3/2001 | Janic et al. ................. 123/350 |
| 6,233,515 | B1 | 5/2001 | Engelman et al. |
| 6,374,173 | B1 | 4/2002 | Ehlbeck |
| 6,990,401 | B2 | 1/2006 | Neiss et al. |
| 8,135,531 | B2 | 3/2012 | Zhao et al. |
| 8,315,775 | B2 | 11/2012 | Biondo et al. |
| 2004/0084237 | A1 * | 5/2004 | Petrie, Jr. .................. 180/170 |
| 2007/0067087 | A1 * | 3/2007 | Ohshima ..................... 701/93 |
| 2012/0232731 | A1 * | 9/2012 | Sujan et al. ................. 701/22 |
| 2013/0158829 | A1 * | 6/2013 | Schumann .................. 701/93 |
| 2013/0297160 | A1 * | 11/2013 | Kar et al. ................... 701/54 |
| 2015/0057906 | A1 * | 2/2015 | Nefedov ..................... 701/93 |

* cited by examiner

*Primary Examiner* — Rodney Butler
(74) *Attorney, Agent, or Firm* — Foley & Lardner LLP

(57) ABSTRACT

A method of selectively adjusting one or more cruise droop settings based on past and present road loads includes receiving a cruise control operating mode initiation for a vehicle; receiving vehicle operation data; determining a current road load for the vehicle based on the vehicle operation data, wherein the current road load provides an indication of a load on the vehicle; maintaining a history of determined road loads while the vehicle is in the cruise control operating mode; and selectively adjusting a cruise control droop characteristic based on the current road load and the history of determined road loads.

20 Claims, 10 Drawing Sheets

US 9,187,093 B1

SYSTEMS AND METHODS OF CRUISE DROOP CONTROL

TECHNICAL FIELD

The present disclosure relates to a cruise control system for a vehicle. More particularly, the present disclosure relates to systems and methods of dynamically controlling various characteristics of a cruise control system of a vehicle.

BACKGROUND

Today, many vehicles include a cruise control operating mode. Cruise control enables the vehicle to operate at or near a set speed without operator input (e.g., depression of the accelerator pedal). For example, during highway or freeway driving, an operator may set a cruise control speed near the posted speed limit. At which point, the operator need not control the accelerator pedal to control the vehicle's speed. Furthermore, by relieving operator speed input, inconsistent and transient acceleration/deceleration events are reduced, which consequently reduces the acceleration/deceleration spikes that cause unsmooth vehicle operation. As such, cruise control provides for a relatively smoother vehicle operation while permitting reduced operator input.

SUMMARY

One embodiment relates to a method of selectively adjusting one or more cruise droop settings based on past and present road loads. The method includes receiving a cruise control operating mode initiation for a vehicle; receiving vehicle operation data; determining a current road load for the vehicle based on the vehicle operation data, wherein the current road load provides an indication of a load on the vehicle; maintaining a history of determined road loads while the vehicle is in the cruise control operating mode; and selectively adjusting a cruise control droop characteristic based on the current road load and the history of determined road loads. By adjusting the cruise control droop characteristics in real time based on past and present road loads, operation of the cruise control system is tailored to the specific operation of the vehicle where the method is implemented. In turn, the method may be customized to be based on one or more operator preferences (e.g., minimize fuel economy) to further make the adjustments in accord with the operator's preference.

Another embodiment relates to a method of selectively adjusting one or more cruise droop settings based on past, present, and projected road loads. The method includes receiving a cruise control operating mode initiation for a vehicle; receiving vehicle operation data; determining a road load for the vehicle based on the vehicle operation data, wherein the road load provides an indication of a load on the vehicle; maintaining a history of determined road loads while the vehicle is in the cruise control operating mode; projecting a next road load for the vehicle based on the history of determined road loads; and selectively adjusting a cruise control droop characteristic based on the projection and the history of determined road loads. By basing the projection on past and current road loads, the method does not need expensive technology and equipment to make the projection. Accordingly, the method may be appealing to budget conscious vehicle operators.

Still another embodiment relates to an apparatus. The apparatus includes an operator interface module, a load determination module, a history module, and a vehicle cruise control management module. The operator interface module is structured to receive an input, the input including a cruise control operating mode initiation for the vehicle. The load determination module is structured to determine a road load for the vehicle while the vehicle is in the cruise control operating mode. The history module is structured to maintain a history of the determined road loads. The vehicle cruise control management module is structured to selectively adjust a cruise control droop characteristic based on a current road load and the history of determined road loads.

These and other features, together with the organization and manner of operation thereof, will become apparent from the following detailed description when taken in conjunction with the accompanying drawings.

Figure 1:
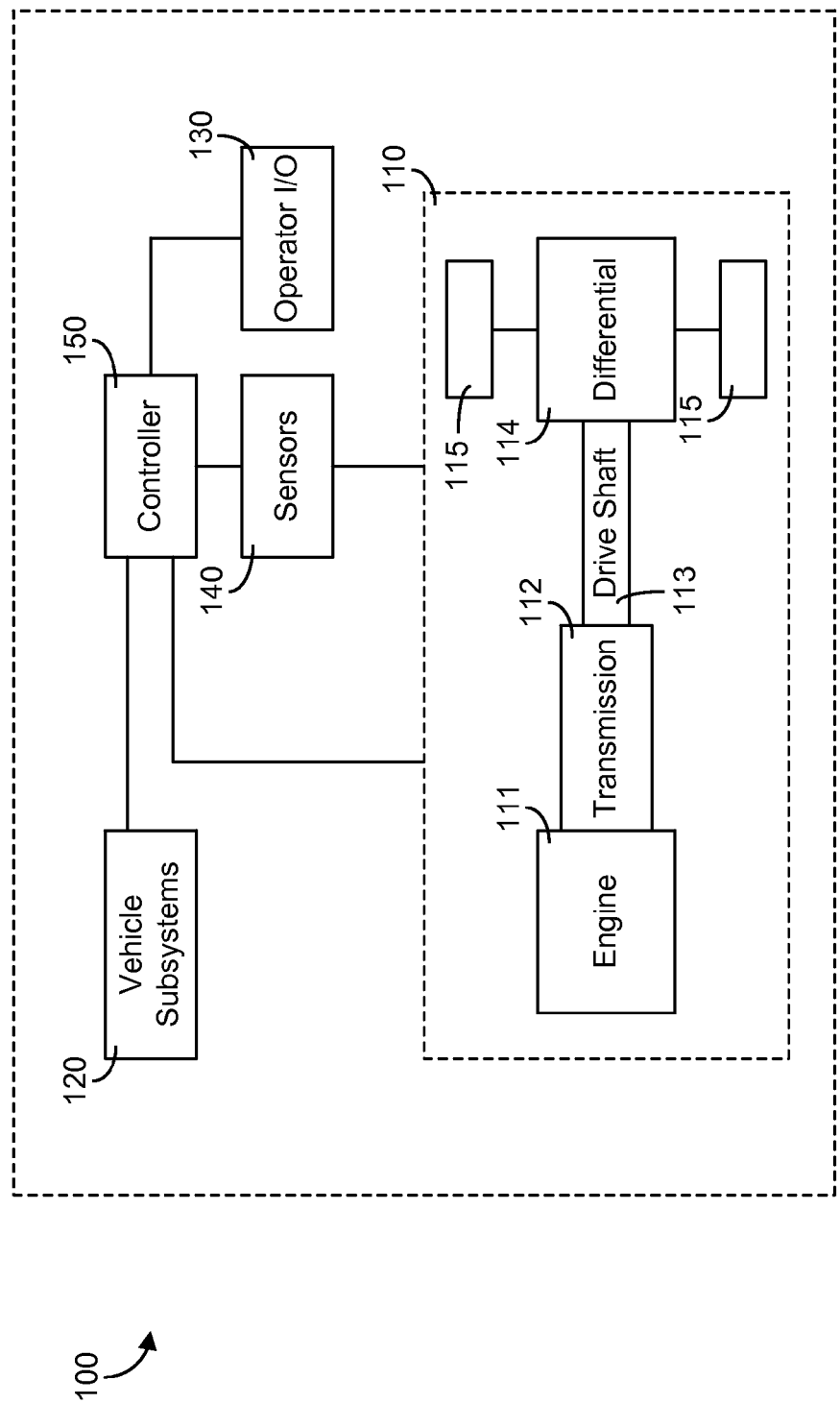
FIG. 1 is schematic diagram of a vehicle with a controller, according to an example embodiment.

These and other features, together with the organization and manner of operation thereof, will become apparent from the following detailed description when taken in conjunction with the accompanying drawings.

DETAILED DESCRIPTION

Referring to the figures generally, the various embodiments disclosed herein relate to systems and methods of dynamically controlling one or more cruise control droop characteristics. Cruise control droop characteristics refer to the parameters that control the cruise control operating mode for a vehicle. For example, when a vehicle in cruise control is on a relatively steep grade, the cruise control droop control parameters may permit the vehicle to go to a slower speed than the set speed to conserve fuel while the vehicle climbs the grade. Typically, the allowed differential speed below the set speed is predefined in the control system. In comparison, when the vehicle is travelling downhill (e.g., a downhill grade), the momentum of the vehicle may push the vehicle above the set speed. Typically, the allowed differential speed above the set speed is also predefined in the control system.

The point where the vehicle is permitted to decrease speed is referred to as the upper droop breakpoint while the point where the vehicle is permitted to increase speed is referred to as the lower droop breakpoint. According to the present disclosure, a controller is able to adjust these breakpoints, among other droop characteristics, based on the load on the vehicle to achieve a desired vehicle operating parameter (e.g., minimize fuel consumption). Rather than utilizing costly technology to determine precise locations where the vehicle will encounter various road grades to adjust cruise control droop characteristics, the controller adjusts the droop characteristics based on comparing a current operating band (i.e., road load) to a history of tracked and maintained operating bands for the vehicle. In some embodiments, the controller may also base the adjustment on a projected future power operating band compared to the history of power operating bands. Therefore, the controller provides modularity to cruise control systems to enable dynamic droop control while also providing for improved operability characteristics, such as drivability (i.e., smoothness of operation) and fuel economy.

An example operation of the controller may be as follows. An operator initiates cruise control with the vehicle. The controller receives vehicle operation data including, but not limited to, engine speed and torque data to determine road loads for the vehicle while in cruise control. The controller maintains a history log of the determined road loads. At some point while still in cruise control, the controller may determine a road load outside an acceptable deviation from a nominal road load. For example, the vehicle may be travelling up a relatively steeper grade but the determined road load is not sufficiently high to reach the upper droop breakpoint. As such, the vehicle is increasing fuelling commands to maintain speed. However, the operator may be more concerned with fuel economy. Based on this elevated road load occurring for either a preset amount of time or a preset amount of distance, the controller selectively adjusts one or more cruise droop characteristics in accord with the current elevated power operating band. In this instance, the controller may decay the upper droop breakpoint to reach the current elevated road load to enable the vehicle speed to decrease (up to a maximum amount relative to the set speed) to improve fuel economy in accordance with the operator preference. By making adjustments after a preset amount of time or distance, the controller filters away transient power excursions to substantially prevent adjustments based on momentary driving conditions. In the above example, the droop characteristic was adjusted to conserve fuel economy. In other examples, the droop characteristic may be adjusted based on other desired operating parameters. For example, if the operator chose to minimize trip time, the controller may increase the upper droop breakpoint such that the vehicle is rarely allowed to decrease from the set speed. These and other example configurations are explained more fully herein.

Referring now to FIG. 1, FIG. 1 shows a schematic diagram of a vehicle 100 with a controller 150 according to an example embodiment. The vehicle 100 may be an on-road or an off-road vehicle including, but not limited to, line-haul trucks, mid-range trucks (e.g., pick-up truck), tanks, airplanes, and any other type of vehicle that utilizes cruise control systems. Although FIG. 1 depicts the vehicle 100 as including an internal combustion engine 111, the vehicle 100 may be powered by any type of engine system. For example, the vehicle 100 may be a hybrid vehicle, a full electric vehicle, and/or an internal combustion engine powered vehicle as shown.

As shown, the vehicle 100 generally includes a powertrain system 110, vehicle subsystems 120, an operator input/output (I/O) device 130, and sensors 140 that are all communicably coupled to the controller 150. Communication between and among the components of the vehicle 100 may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a controller area network ("CAN") bus provides the exchange of signals, information, and/or data. The CAN bus includes any number of wired and wireless connections. Because the controller 150 is communicably coupled to the systems and components in the vehicle 100 of FIG. 1, the controller 150 is structured to receive data from one or more of the components shown in FIG. 1. For example, the data may include vehicle operation data (e.g., engine speed, engine torque, vehicle speed, engine temperature, etc.) received via one or more sensors, such as sensors 140. As described more fully herein, with this data, the controller 150 tracks vehicle road loads while in cruise control and selectively adjusts one or more cruise droop characteristics based on the determined road loads.

As shown in FIG. 1, the powertrain system 110 includes an engine 111, a transmission 112, a drive shaft 113, a differential 114, and a final drive 115. As a brief overview, the engine 111 receives a chemical energy input (e.g., a fuel such as gasoline or diesel) and combusts the fuel to generate mechanical energy, in the form of a rotating crankshaft. The transmission 112 receives the rotating crankshaft and manipulates the speed of the crankshaft (to affect a desired drive shaft 113 speed. The rotating drive shaft 113 is received by a differential 114, which provides the rotation energy of the drive shaft 113 to the final drive 115. The final drive 115 then propels or moves the vehicle 100.

The engine 111 may be structured as any engine type: from an internal combustion engine to a full electric engine. As shown, the engine 111 is structured as an internal combustion engine (e.g., compression-ignition or spark-ignition) that can be powered by any fuel type (e.g., diesel, ethanol, gasoline, etc.). Similarly, the transmission 112 may be structured as any type of transmission, such as a continuous variable transmission, a manual transmission, an automatic transmission, an automatic-manual transmission, a dual clutch transmission, etc. Accordingly, as transmissions vary from geared to continuous configurations (e.g., continuous variable transmission), the transmission can include a variety of settings (gears, for a geared transmission) that affect different output speeds based on the engine speed. Like the engine 111 and the transmission 112, the drive shaft 113, differential 114, and final drive 115 may be structured in any configuration dependent on the application (e.g., the final drive 115 is structured as wheels in an automotive application and a propeller in an airplane application). Further, the drive shaft 113 may be structured as any type of drive shaft including, but not limited to, a one-piece, two-piece, and a slip-in-tube driveshaft based on the application.

The vehicle 100 is also shown to include vehicle subsystems 120. The vehicle subsystems 120 may include both electrically-powered vehicle accessories and engine 111 driven vehicle accessories as well any other type of subsystem in the vehicle 100. For example, a subsystem may include an exhaust aftertreatment system. The exhaust aftertreatment system may include any component used to reduce diesel exhaust emissions, such as selective catalytic reduction catalyst, a diesel oxidation catalyst, a diesel particulate filter, a diesel exhaust fluid doser with a supply of diesel exhaust fluid, and a plurality of sensors for monitoring the aftertreatment system (e.g., a NOx sensor). The accessories may include, but are not limited to, air compressors (for pneumatic devices), air conditioning systems, power steering pumps, engine coolant pumps, fans, and the like.

The operator input/output device 130 enables an operator of the vehicle 100 (or another passenger) to communicate with the vehicle 100 and the controller 150. For example, the operator input/output device 130 may include, but is not limited, an interactive display, a touchscreen device, one or more buttons and switches, voice command receivers, etc. Via the operator input/output device 130, the user may input a desired operating characteristic including, but not limited to: minimize fuel consumption; minimize trip time; minimize power consumption; limit power output; and the like. The controller 150 may selectively adjust one or more cruise control droop characteristics to accommodate the inputted preference. This is explained more fully in regard to FIG. 2.

As the components of FIG. 1 are shown to be embodied in a vehicle 100, the controller 150 may be structured as an electronic control module (ECM). The ECM may include a transmission control unit and any other vehicle control unit (e.g., exhaust aftertreatment control unit, powertrain control module, engine control module, etc.). The function and structure of the controller 150 is described in greater detail in FIG. 2.

Figure 2:
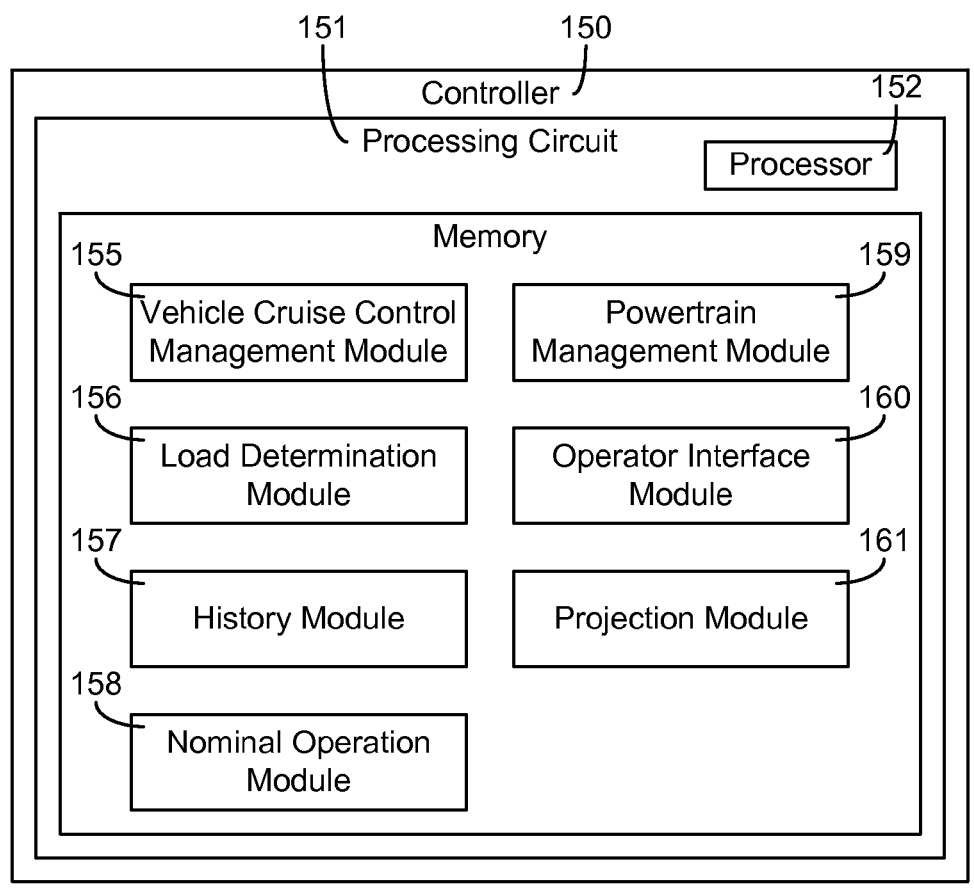
FIG. 2 is a schematic of the controller used with the system of FIG. 1, according to an example embodiment.

As such, referring now to FIG. 2, the function and structure of the controller 150 are shown according to one embodiment. The controller 150 is shown to include a processing circuit 151 including a processor 152 and a memory 154. The processor 152 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 154 (e.g., RAM, ROM, Flash Memory, hard disk storage, etc.) may store data and/or computer code for facilitating the various processes described herein. Thus, the one or more memory devices 154 may be communicably connected to the processor 152 and provide computer code or instructions to the processor 152 for executing the processes described in regard to the controller 150 herein. Moreover, the one or more memory devices 154 may be or include tangible, non-transient volatile memory or non-volatile memory. Accordingly, the one or more memory devices 154 may include database components, object code components, script components, or any other type of information structure for supporting the various activities and information structures described herein.

The memory 154 is shown to include various modules for completing the activities described herein. More particularly, the memory 154 includes modules configured to selectively adjust one or more cruise control parameters of a vehicle. While various modules with particular functionality are shown in FIG. 2, it should be understood that the controller 150 and memory 154 may include any number of modules for completing the functions described herein. For example, the activities of multiple modules may be combined as a single module, as additional modules with additional functionality may be included, etc. Further, it should be understood that the controller 150 may further control other vehicle activity beyond the scope of the present disclosure.

As shown, the controller 150 includes a vehicle cruise control management module 155, a load determination module 156, a history module 157, a nominal operation module 158, a powertrain management module 159, an operator interface module 160, and a projection module 161. The operator interface module 160 may be communicably coupled to the operator I/O device 130 and is structured to receive one or more inputs from an operator, passenger, or other user in the vehicle 100. The input may include a cruise control operating mode initiation for the vehicle. The input may then further include a cruise control set speed. Adjustments to the set speed may also be received as an input. Similarly, the input may include a deactivation of cruise control. As an example, an operator may activate cruise control and input a cruise control set speed. Various vehicle parameters may also be received via interface module 160 and/or otherwise stored in memory 154. These vehicle parameters may be used by the load determination module 156 and generally include a vehicle mass, vehicle aerodynamic coefficient, tire dynamic rolling resistance, tire static rolling resistance, tire circumference, radius or diameter, a lookup table for the a final drive torque loss, a lookup table for a transmission torque loss, and a lookup table for an engine torque loss. Other functions of the operator interface module 160 are described in regard to the projection module 161 and the powertrain management module 159.

The powertrain management module 159 is structured to provide commands to selectively control one or more components in the powertrain system 110. The powertrain management module 159 is also structured to receive notification (e.g., a signal) that cruise control has been activated/deactivated and the set speed from the operator interface module 160. The powertrain management module 159 manages the fueling, torque, engine speed, transmission setting, and any other component to achieve or substantially achieve the cruise control set speed. For example, during an uphill portion of a route, the powertrain management module 159 may increase fueling to increase power output to maintain the set speed. The cruise control characteristics that impact the commands provided by the powertrain module 159 are provided from and controlled by the vehicle cruise control management module 155.

Figure 3:
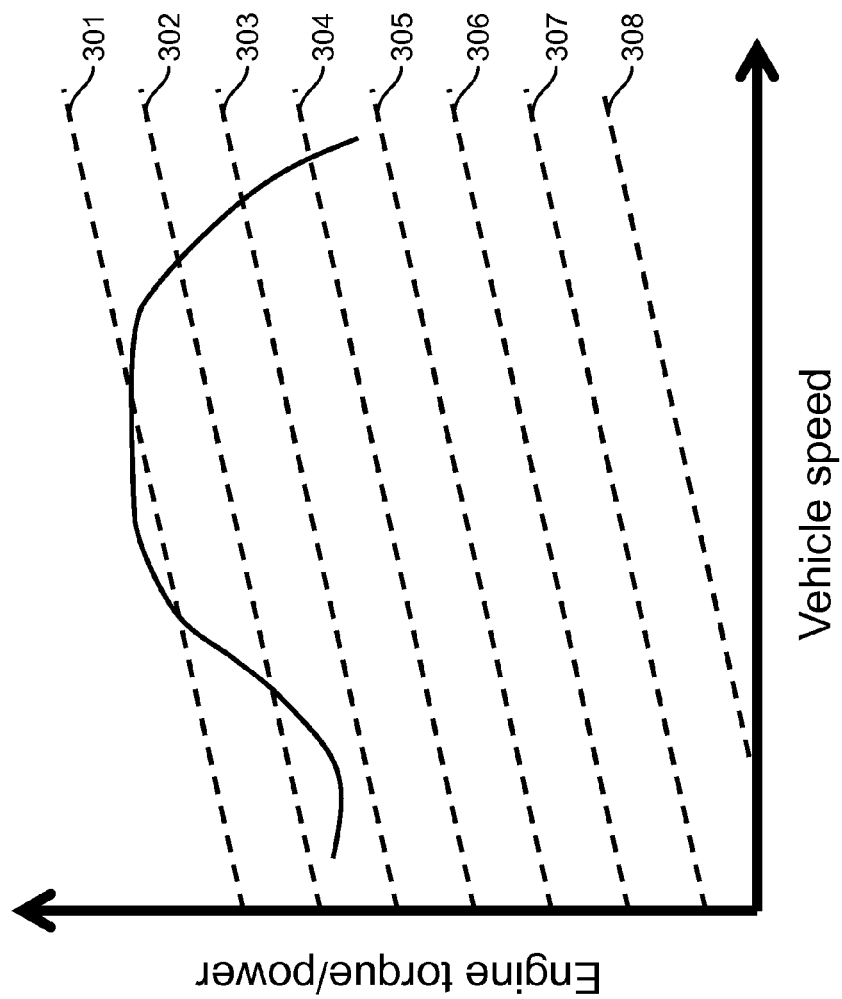
FIG. 3 is a graph of operating bands for a vehicle, according to an example embodiment.

The load determination module 156 is structured to determine a road load for the vehicle. The road load is the load that the engine/vehicle overcomes to maintain or substantially maintain the cruise control set speed. The determined road load may correspond with an operating band of the engine. The operating band provides an indication of a power output of the vehicle during the cruise control operating mode. Referring now to FIG. 3, engine power as a function of vehicle speed is shown, according to an example embodiment. As shown, a plurality of operating bands, lines 301-308, for a vehicle are plotted on a graph to depict engine power versus vehicle speed. The use of "operating bands" is to indicate that uncertainty may be present in the road load determinations described herein. For example, one or more of the variables used to determine road load (e.g., $P_{Aero}$) may be estimated. As such, there may be uncertainty bands or amounts associated with each road load determination. Therefore, in one embodiment, the system and methods described herein utilize operating bands that represent the uncertainties associated with the determined road loads for a designated cruise control set speed. In other embodiments, the road load determinations described herein may themselves include the uncertainty estimates/amounts/determinations. This is reflected in the description below that explains that one or more variables associated with the road load determination may be estimated, which may lead to uncertainties. Accordingly, the determined road loads herein may include an amount of uncertainty. Therefore, the adjustment determinations may include defining when an adjustment is made based on the uncertainty included in the determinations. If the uncertainty is above a preset threshold, the module 155 may not make any adjustments. This operational limitation may be done to substantially prevent adjustments that may adversely impact operability of the vehicle and/or one or more of the operator's preferences (e.g., minimize fuel consumption).

To determine the road load of the vehicle, the load determination module 156 may use vehicle operation data acquired by one or more sensors in the vehicle 100, such as sensors 140. The sensors may include, but are not limited to: engine speed sensors; vehicle speed sensors; engine torque sensors; vehicle mass sensors; road grade measurement sensors (e.g., an inclinometer); and the like. Accordingly, the vehicle operation data may include, but is not limited to, an engine speed, a vehicle speed, an engine torque, a vehicle mass, a road grade, etc. In certain embodiments, the load determination module 156 may use one or more of the following equations to determine the road load. In doing so, the module 156 may use various vehicle parameters described above (e.g., vehicle mass, road grade angle (θ), etc.). The following equations are intended to show one example road load determination process. In other embodiments, the load may be directly measured without the use of such equations. All such variations and methods are intended to be within the scope and spirit of the present disclosure.

Figure 4:
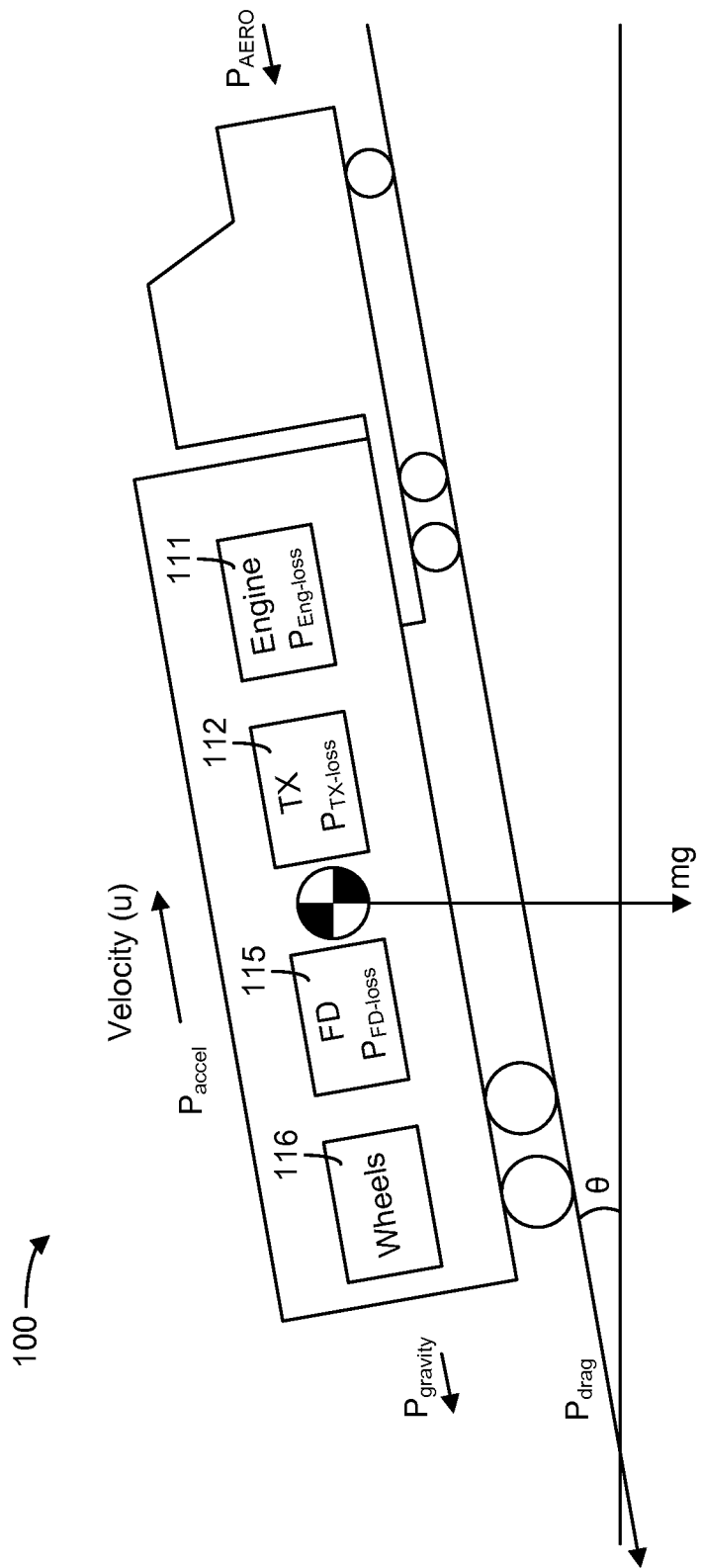
FIG. 4 is schematic of a force diagram for a vehicle, according to an example embodiment.

Referring to FIG. 4, schematic of vehicle 100 is shown that indicates the power required to overcome various forces associated with vehicle 100. FIG. 4 is used to show one example process of determining a vehicle road load. Generally speaking, as shown, vehicle 100 includes an engine 111, a transmission 112, a final drive 115, and wheels 116. The powers associated with vehicle 100 include $P_{Aero}$, the engine power required to overcome aerodynamic or wind resistance, $P_{Accel}$, which is the power required to accelerate vehicle 100, $P_{Drag}$, which is the power required to overcome the drag of wheels 116, and $P_{Gravity}$, which is the power required to overcome the force of gravity. Additionally, engine 111 also needs to overcome $P_{Eng-Loss}$, which is equivalent to the efficiency of engine 111, $P_{TX-Loss}$, which is the efficiency of transmission 112, and $P_{FD-Loss}$, which is the efficiency of final drive 115. The power consumed for propelling a vehicle $P_{Road\ Load}$ is equivalent to the power from engine 111, $P_{Eng-Out}$, which may be determined from Equation (1).

$$P_{Road\ Load} = P_{Eng-Out} = P_{Aero} + P_{Drag} + P_{Gravity} + P_{Accel} + P_{Loss} \quad \text{Equation (1)}$$

Each of these terms is calculated using inputs from a variety of locations, as mentioned above. Some of the values may be predefined in the controller 150 as vehicle parameters, as also described above. The power to overcome the aerodynamic drag or wind resistance of vehicle 100, $P_{Aero}$, may be calculated from Equation (2).

$$P_{Aero} = \left(\frac{A \cdot C_D \cdot \rho \cdot u^2}{2}\right) \cdot u \quad \text{Equation (2)}$$

In Equation (2), $A \cdot C_D$ is the vehicle aerodynamic drag area (A) times the aerodynamic drag coefficient ($C_D$), which is a measure of aerodynamic resistance of a cross-sectional area. The term ρ is the air density, and the term u is the velocity or speed of vehicle 100. The aerodynamic drag area may be predefined in the module 155 and specific to each vehicle. Air density and velocity may be measured by a density sensor and a vehicle speed sensor.

The next term, the power required to overcome wheel drag, may be calculated using Equation (3).

$$P_{Drag} = [(C_{rr-dyn})(m \cdot g \cdot \cos \theta)(u) + (C_{rr-static})(m \cdot g \cdot \cos \theta)](u) \quad \text{Equation (3)}$$

The term $C_{rr-dyn}$ is the wheel dynamic rolling resistance and the term $C_{rr-static}$ is the wheel static rolling resistance. Each of these terms may be predefined in module 156. The term m is the mass of vehicle 100, the term g is the acceleration due to gravity, and the term θ is a road slope (i.e., road grad). While gravity may be a constant value, the mass of the vehicle 100 may be determined by a mass sensor or an external vehicle 100 scale and then inputted via I/O device 130 to module 155. Accordingly, if the vehicle is structured as a semi-tractor trailer, the mass may significantly change when the trailer is loaded and not loaded, which is now accounted for. Equation (3) may be simplified to the form of Equation (4). As described below, in certain embodiments, the controller 150 adjusts cruise control droop characteristics based on the road load determined using vehicle mass. In other embodiments, the vehicle mass may be assumed to be a constant value, such that fluctuations in vehicle mass (loaded versus unloaded semi-tractor trailer) are not taken into consideration.

$$P_{Drag} = [(C_{rr-dyn})(u)(C_{rr-static})](m \cdot g \cdot \cos \theta)(u) \quad \text{Equation (4)}$$

The power required to overcome the force due to gravity may be found from Equation (5), which uses previously defined terms.

$$P_{Gravity} = (m \cdot g \cdot \sin \theta)(u) \quad \text{Equation (5)}$$

The power required to accelerate vehicle 100 consists of multiple components, including $P_{Veh-Accel}$, which is the power required to accelerate the vehicle alone, $P_{Whl-Accel}$, which is the power to accelerate wheels 116, $P_{FD-Accel}$, which is the power required to accelerate final drive 115, $P_{TX-Accel}$, which is the power required to accelerate transmission 112, and $P_{Eng-Accel}$, which is the power to accelerate engine 111. The required calculation is shown in Equation (6).

$$P_{Accel} = P_{Veh-Accel} + P_{Whl-Accel} + P_{FD-Accel} + P_{TX-Accel} + P_{Eng-Accel} \quad \text{Equation (6)}$$

Each of these terms may be individually calculated. The power required to accelerate the vehicle may be found from the vehicle mass m, the vehicle acceleration a, and the vehicle velocity u, as shown in Equation (7).

$$P_{Veh-Accel} = m \cdot a \cdot u \quad \text{Equation (7)}$$

The power required to accelerate wheels 116 may be found from $I_{Whl}$, which is the inertia of wheels 76, $\dot{\omega}_{Whl}$, which is the angular acceleration of the wheels, and $\omega_{Whl}$, which is the angular velocity of the wheels, as shown in Equation (8).

$$P_{Whl-Accel} = I_{Whl} \cdot \dot{\omega}_{Whl} \cdot \omega_{Whl} \quad \text{Equation (8)}$$

The power required to accelerate final drive 115 may be found from $I_{FD}$, which is the inertia of final drive 115, $\dot{\omega}_{FD}$, which is the final drive angular acceleration, and $\omega_{FD}$, which is the final drive angular velocity, as shown in Equation (9). To determine the inertias, the characteristics of each component (e.g., wheels) may be predefined in the module 156. For example, an operator may specific the radius of the wheel and the mass of such wheel in order to determine the inertia.

$$P_{Whl-Accel} = I_{FD} \cdot \dot{\omega}_{FD} \cdot \omega_{FD} \quad \text{Equation (9)}$$

The power required to accelerate transmission 112 may be found from $I_{TX}$, which is the inertia of transmission 112, $\dot{\omega}_{TX}$, which is the transmission angular acceleration, and $\omega_{TX}$, which is the transmission angular velocity, as shown in Equation (10).

$$P_{TX-Accel} = I_{TX} \cdot \dot{\omega}_{TX} \cdot \omega_{TX} \quad \text{Equation (10)}$$

The power required to accelerate engine 111 may be found from $I_{Eng-Out}$, which is the inertia of engine 111, $\omega_{Eng-Out}$, which is the engine angular acceleration, and $\omega_{Eng-out}$, which as mentioned above is the engine angular velocity, as shown in Equation (11).

$$P_{Eng-Accel} = I_{Eng-Out} \cdot \dot{\omega}_{Eng-Out} \cdot \omega_{Eng-Out} \quad \text{Equation (11)}$$

Each of the angular velocities and angular accelerations may be derived from data provided in the vehicle parameters in conjunction with the vehicle acceleration and velocity.

The final term, $P_{Loss}$, is a summary of the losses that need to be overcome in vehicle 100. These losses may be summarized as in Equation (12).

$$P_{Loss} = P_{FD-Loss} + P_{TX-Loss} + P_{Eng-Loss} \quad \text{Equation (12)}$$

The loss from final drive 115 may be calculated from $\Im(\omega_{FD-in}, \tau_{FD-in})$, which may be found in a lookup table of the final drive torque loss, and $\omega_{FD-in}$, which is the angular velocity of the final drive at the input, as shown in Equation (13).

$$P_{FD-Loss} = \Im(\omega_{FD-in}, \tau_{FD-in}) \cdot \omega_{FD-in} \quad \text{Equation (13)}$$

The loss from transmission 112 may be calculated from $\Im(\omega_{TX-in}, \tau_{TX-in})$, which may be found in a lookup table of the transmission torque loss, and $\omega_{TX-in}$, which is the angular velocity of the transmission at the input, as shown in Equation (14).

$$P_{TX-Loss} = \Im(\omega_{TX-in}, \tau_{TX-in}) \cdot \omega_{TX-in} \quad \text{Equation (14)}$$

The loss from engine 111 may be calculated from $\Im(\omega_{Eng-out})$, which is found in a lookup table of the engine torque loss, as shown in Equation (15).

$$P_{Eng-Loss} = \Im(\omega_{Eng-Out}) \cdot \omega_{Eng-Out} \quad \text{Equation (15)}$$

The power consumed in propelling vehicle 100 may now be shown in terms of all the powers required, as shown in Equation (16).

$$P_{Road\,Load} = P_{Eng-Out} = P_{Aero} + P_{Drag} + P_{Gravity} + (P_{Veh-Accel} + P_{Whl-Accel} + P_{FD-Accel} + P_{TX-Accel} + P_{Eng-Accel}) + (P_{FD-Loss} + P_{TX-Loss} + P_{Eng-Loss}) \quad \text{Equation (16)}$$

Even though $P_{Eng-Loss}$ is shown in Equation (16), it may be accounted for elsewhere, for example it may be integral to $P_{Eng-Out}$ and may not need to be explicitly included in Equation (16).

As mentioned above, the aforementioned equations, in connection with FIG. 4, illustrate one method of determining a road load (e.g., $P_{Road\,Load}$). Other methods, processes, models, measurements, and the like may also be used by module 156, such that all such variations are intended to be within the spirit and scope of the present disclosure. Moreover, in some embodiments, the values utilized in the above equations are measured/recorded from various vehicle sensors. For example, the velocity of the vehicle may be measured by a speed sensor. In other embodiments, one or more of the variables above is estimated rather than measured/recorded. For example, over time, the coefficient of friction between the wheels and the road ($C_{rr-dyn}$ and $C_{rr-static}$) may decrease due to a decreasing amount of tired tread. Because a measurement may not be readily available, the module 156 may estimate the coefficients of friction over time (e.g., use a look-up table for mileage versus friction coefficient for that specific tire). All such variations are intended to be within the scope of the present disclosure.

The load determination module 156 may be structured to continuously determine the vehicle road load or, in certain embodiments, the determination may be made after a preset amount of time or distance. The preset amount of time or distance may be defined by a user via I/O device 130.

The road loads determined by module 156 are provided to history module 157. The history module 157 is structured to track and maintain the vehicle road loads. In one configuration, the determined road loads are tracked during a cruise control session. One cruise control session may correspond with a user activating and then, at some future time, deactivating cruise control. In another example, the cruise control session may permit a brief deactivation (e.g., thirty seconds, one-mile, etc.). For example, the operator may be travelling in cruise control and then apply the brakes of the vehicle to deactivate cruise control. The operator then re-activates cruise control within a predetermined time (or distance) frame. In this example, the history may correspond with the road loads determined prior to deactivation and after re-activation. In another example configuration, an operator may designate a route of the vehicle 100 via I/O device 130. If this route has been previously travelled by the vehicle 100 (or some portion thereof), the history module 157 may recall the determined road loads for that route or portion thereof. In certain other embodiments, the history module 157 may maintain a history based on a cruise control set speed. For example, a user may designate a set speed of 55 miles-per-hour (MPH) and, four minutes later, increase the set speed to 60 MPH. The history module 157 may determine a first set of road loads for the 4 minute 55 MPH period and a second set of road loads for the 60 MPH travelling period and demarcate the two sets. In this instance, the history module 157 recognizes the road load for substantially maintaining a vehicle at 55 MPH is likely different from that of 60 MPH. In each example configuration, a history of road loads is tracked and maintained during the cruise control operation mode.

Figure 5:
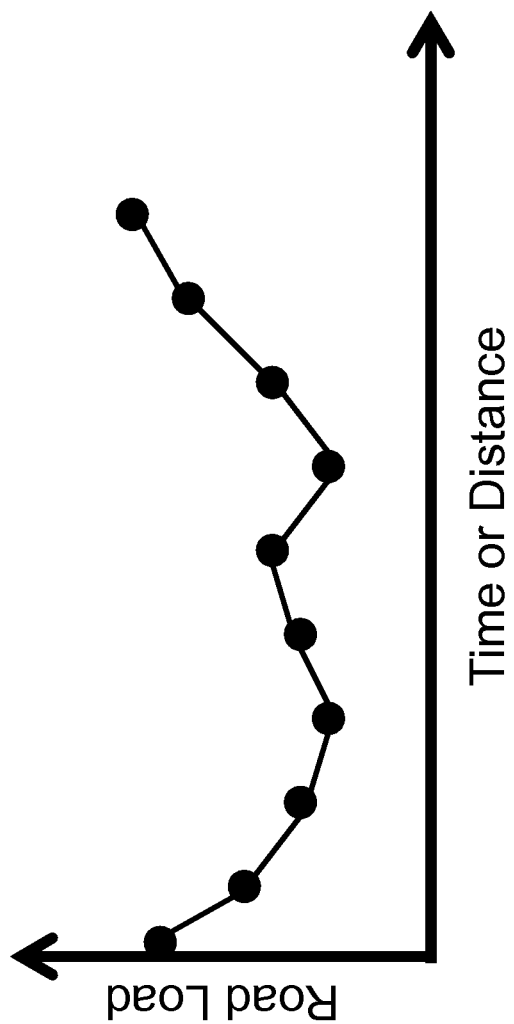
FIG. 5 is a graph of tracked road loads for a vehicle during a cruise control session, according to an example embodiment.

Referring now to FIG. 5, FIG. 5 depicts a graph of determined road loads for a vehicle over a time or distance of travel of the vehicle. In FIG. 5, the vehicle road loads correspond with power operating bands for the vehicle as shown in FIG. 3. In each representation, the bands or road loads correspond with a power output of the engine. FIG. 5 depicts the road loads encountered by the vehicle 100 for a cruise control operating mode session.

With this history of determined road loads, the nominal operation module 158 is structured to determine a nominal road load. The nominal road load represents a representative road load for the cruise control session. The representative load may correspond with an average, a median, and the like. The nominal road load may also include uncertainty aspects to account for estimations used in the road load determinations. For example, a nominal load may be 325 horsepower plus-or-minus 20 horsepower.

The vehicle cruise control management module 155 is structured to selectively adjust one or more cruise control droop characteristics. In one embodiment, the adjustments are applied to the default cruise droop characteristics that are determined after a user/operator sets a cruise control speed. Accordingly, the otherwise default cruise control system parameters are adjusted dynamically based on the determinations described herein. In another embodiment, the adjustments may be based on a nominal road load for a cruise control session and be independent of the default cruise control droop characteristics. In still another embodiment, the adjustments may be based on both the nominal road load and the default cruise control droop characteristics.

When the adjustments are made relative to the nominal road load, the adjustment is based on a current road load compared to the nominal road load for the cruise control session. One configuration corresponds with the module 155 selectively adjusting a cruise droop characteristic based on the current road load being outside an acceptable deviation from the nominal road load. The acceptable deviation may be predefined by a user. For example, acceptable deviations may correspond with determined road load powers within ten percent of the nominal road load. If the current road load for a present amount of time or distance is outside this acceptable amount, the module 155 may adjust one or more cruise droop characteristics. The acceptable deviation amount may vary based on the application of the controller 150. For example, when utilized in line haul trucks, the acceptable deviation may be larger (e.g., plus-or-minus fifteen percent) than in sedan automobiles (e.g., plus-or-minus five percent). This may correspond with the mass difference between the two vehicles, such that the relatively heavier vehicle experiences a relatively larger gravity force which tends to fluctuate its road load power more than the lighter vehicle. As described above, the adjustment may be based on the deviation amount relative to the nominal road load. For example, if the acceptable deviation amount relative to the nominal road is X percent and the determined road load is X+10 percent, the module 155 grows/adjusts the upper droop breakpoint upward X+10 percent to prevent the upper droop from occurring (if trip time is important to operator). If the determined road load is X+20 percent, the module 155 grows/adjusts the upper droop breakpoint X+20 percent to prevent the upper droop from occurring under the same operator preference. Accordingly, the adjustment may correspond with the current road load deviation amount (for a preset amount of time or distance) relative to a nominal road load. Thus, the controller 150 actively adjusts the droop characteristics for the road loads specifically encountered by the vehicle. In certain other embodiments, the adjustment may be a preset amount depending on where the current road load is relative to the nominal road load. In this case, the adjustment may not fully correspond X+10 percent. For example, the upper droop breakpoint may only grow by X+5 percent due to a default of splitting the difference between the current road load and the nominal road load. As described below, these adjustments may further be constrained by one or more operator preferences. Accordingly, as can be seen above, the adjustment amount/percentage/etc. can be highly configurable based on the application and desires of operator.

As also mentioned above, in another embodiment, the vehicle cruise control management module 155 is structured to selectively adjust one or more cruise control droop characteristics based on the current road load compared to the preset (e.g., default) cruise droop characteristics for the cruise control set speed. In other words, the adjustment is based on the comparison of the current road load (for a preset amount of time or distance) relative to the default cruise droop characteristics that are generated for a cruise control set speed (see FIG. 6 which is explained below). The adjustment may be based on the current road falling within or outside an acceptable deviation of one or more cruise droop characteristics. For example, the acceptable deviation may correspond with plus-or-minus ten percent from the default upper and lower droop breakpoints. If the current road load is within this percentage, no adjustment may be made. However, if the current road load (for a preset amount of time or distance) is outside this deviation, the module 155 may adjust a cruise control droop characteristic (e.g., decay the upper droop breakpoint). As with the above configuration, these adjustments may be constrained by one or more operator preferences (e.g., minimize fuel consumption). Nonetheless, in this example implementation, the nominal road load determination may not be used.

Figure 6:
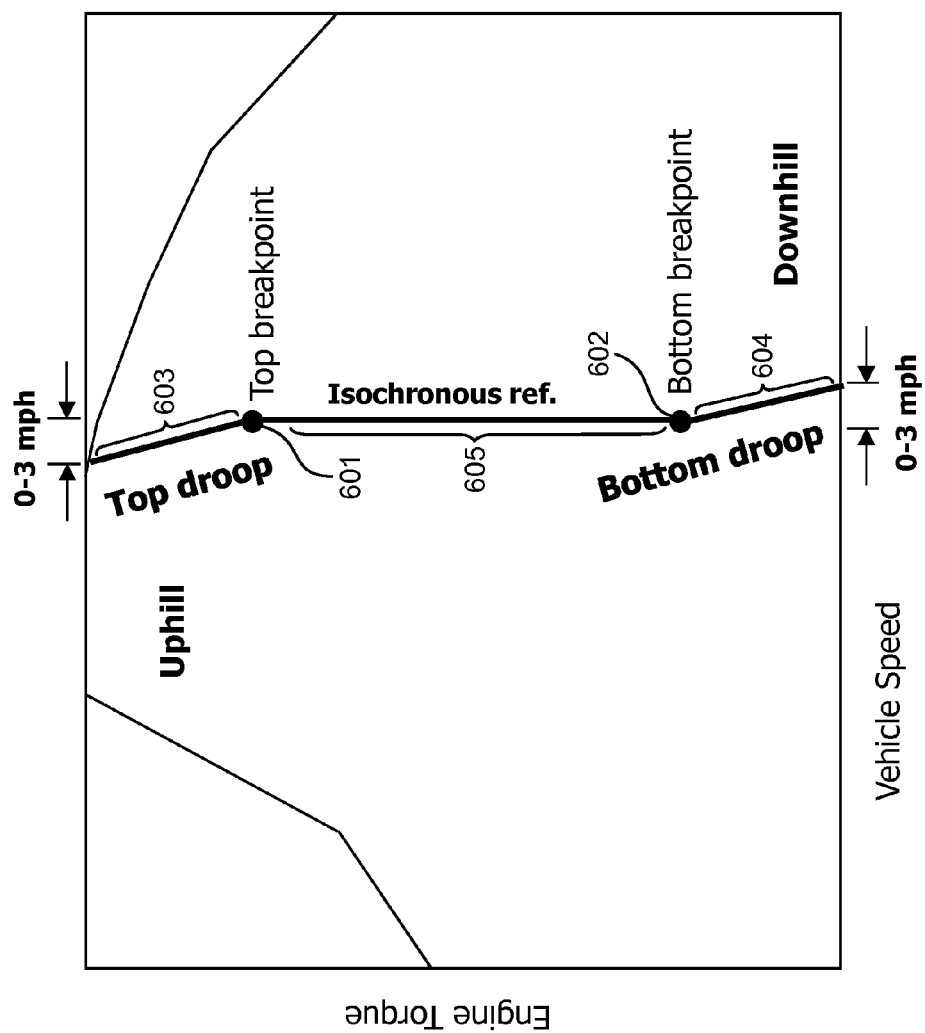
FIG. 6 is a schematic of a static cruise control droop line with upper and lower droop breakpoints, according to an example embodiment.
Figure 7:
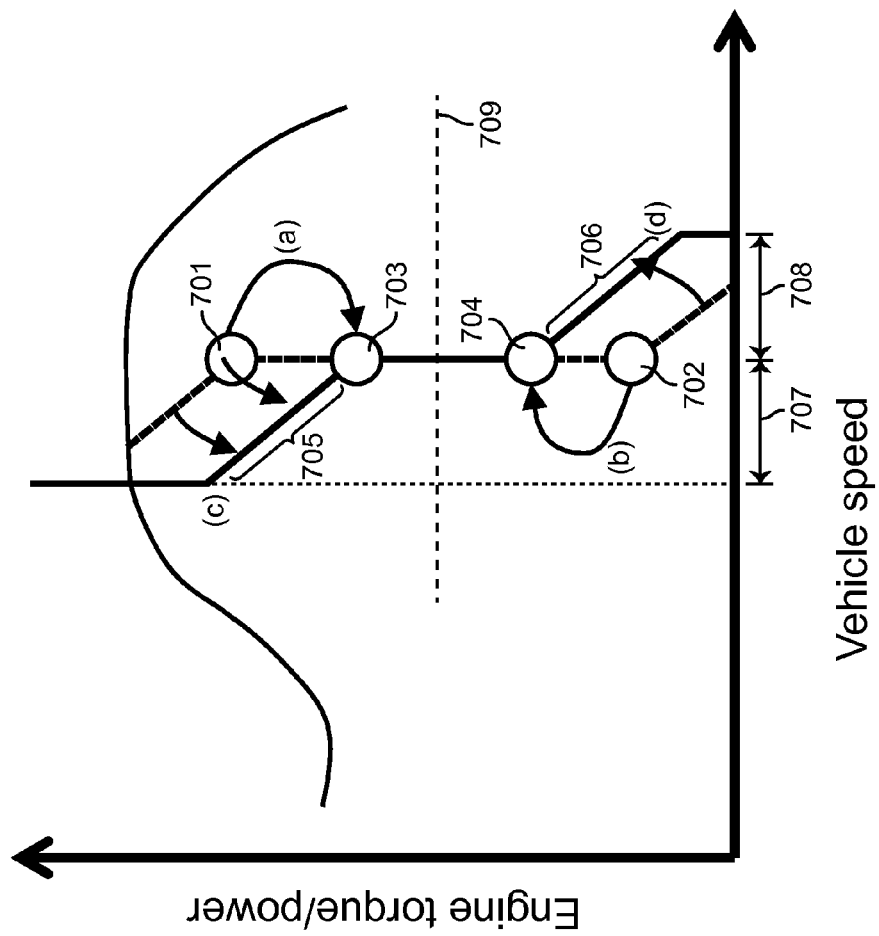
FIG. 7 is a schematic of possible cruise control droop characteristic adjustments, according to an example embodiment.

Accordingly, to aid explanation of module 155, FIGS. 6-7 shows various cruise droop characteristics (FIG. 6) and adjustments made by the module 155 to those characteristics (FIG. 7). FIG. 6 depicts a static cruise droop line, according to an example embodiment. This graph depicts the default cruise control droop characteristics for a cruise control set speed. These are the characteristics that are adjusted by the controller 150. As shown in FIG. 6, the cruise droop line 600 includes an upper droop breakpoint 601, a lower droop breakpoint 602, an upper droop 603, a lower droop 604, and an isochronous portion 605. The isochronous portion corresponds with the set cruise speed. The upper droop breakpoint 601 is the point at which the engine torque or power for maintaining the set speed exceeds a certain threshold. At this high power threshold—the breakpoint—the vehicle is allowed to lower its speed. By lower the vehicle speed, the vehicle is able to operate at a lower power and save fuel. In many instances, however, the vehicle speed is only permitted (by, e.g., powertrain management module 159) to decrease its speed by a limited amount (e.g., 0-3 MPH). The rate at which this speed drop is achieved is shown via the slope of the upper droop 603 portion. The upper droop breakpoint usually corresponds with uphill grades encountered by the vehicle. In comparison, the lower droop breakpoint 602 is the lower power threshold—the breakpoint—where the vehicle is allowed to increase its speed relative to the set speed. By travelling downhill, the vehicle momentum reduces the power needed to maintain the cruise set speed. The bottom droop 604 shows the permitted vehicle speed increase. Like the upper droop 603, in many instances, the vehicle speed is only permitted to increase by a set amount (e.g., 0-3 MPH) relative to the cruise set speed. The slope of the bottom droop 604 portion corresponds with the rate at which the speed is permitted by the powertrain management module 159 to increase. Typically, these cruise droop characteristics (e.g., the droop breakpoints, the maximum droop speed increase and decrease (i.e., the droop amount), and the droop slope) are predefined in the vehicle cruise control management module 155. According to the present disclosure, the controller 150 selectively adjusts one or more of these characteristics based on past and present road loads. In another embodiment, the module 155 selectively adjusts one or more of these characteristics based on past, present, and predicted future road loads.

Accordingly, referring to FIG. 7, FIG. 7 depicts adjustments to cruise droop characteristics performed in real time by the vehicle cruise control management module 155. In some instances, the upper breakpoint 701 and lower breakpoint 702 may be predefined in the module 155 based on the cruise control set speed (e.g., plus-or-minus thirty percent of the road load corresponding with the cruise control speed when set represents the upper and lower droop breakpoint). Further, the droop amounts and slopes may also be preset in the module 155. Unlike the static line and characteristics in FIG. 6, however, FIG. 7 shows that based on the determinations made by module 155 (described below), the module may—in real time operation —adjust the upper droop breakpoint (703), lower droop breakpoint (704), upper droop slope (705), lower droop slope (706), upper droop (707) vehicle speed decrease amount relative to the set speed, and lower droop (708) vehicle speed increase amount relative to the cruise set speed. The adjustments may specifically include, but are not limited to, a decay or growth (i.e., increase in road load to trigger the breakpoint) of the upper droop breakpoint; a decay or growth (i.e., decrease in road to trigger the breakpoint) of the lower droop breakpoint; a flattening or increase of the upper/lower droop slope; an adjustment to the upper droop or lower droop vehicle speed amount; and a deactivation of a upper or lower droop breakpoint (e.g., not allowing the vehicle to decrease speed by removing the upper droop breakpoint or, not allowing the vehicle to increase speed by removing the lower droop breakpoint). As used herein, the term "growth" of the upper/lower breakpoint refers to the adjustment of that breakpoint closer to other breakpoint (e.g., adjusting the lower droop breakpoint closer to the upper droop breakpoint, which decreases the separation road load between the two breakpoints) while the term "decay" refers to the movement of the upper/lower breakpoint away from the other breakpoint (e.g., an increase in separation road load between the two breakpoints). As shown specifically in FIG. 7, the upper and lower droop breakpoints 703, 704 are decayed. These adjustments are explained more fully below.

In certain embodiments, each of these adjustments may be confined by one or more cruise control droop settings. The cruise control droop settings may be predefined in the vehicle cruise control management module 155 and/or received by the operator interface module 160. For example, the maximum vehicle speed increase and decrease, relative to the set speed, may be predefined as 3 MPH. In another example, the decay (or, growth) amount of the upper and lower breakpoints may also be constrained to prevent the two breakpoints from coming too close together. This may defined by constraining the separation power (i.e., the road load or engine power that triggers the upper and lower breakpoint) to be at a minimum defined amount. By specifying a minimum separation power, the controller 150 substantially prevents droop speed increases/decreases from occurring at a rate that may cause operator dissatisfaction (e.g., too frequently). Accordingly, although the controller 150 may actively adjust these characteristics, the controller 150 may be limited to the extent that these characteristics are adjusted based on one or more cruise droop settings.

With this functionality in mind, an explanation of when and how the adjustments are made may be as follows. As mentioned above, in one embodiment, an adjustment is made based on a current determined road load being outside an acceptable deviation from the nominal road load. Using FIG. 7, the nominal road load may correspond with road loads falling between the upper (701) and lower (702) droop breakpoints. In the example of FIG. 7, the nominal road load is shown as line 709, which represents the median road load for the cruise set speed. The load management module 155 may determine a current road load falling more than ten percent (outside the predefined acceptable deviation amount) above the nominal road load line 709. In one instance, the determination is based on the current road load being outside the acceptable deviation for at least one of a preset amount of time or distance. Accordingly, the module 155 filters out minor road load excursions to avoid making hasty adjustments that may affect drivability (i.e., the smoothness of operation of the cruise control system as felt by the operator). The preset amount of time or distance may be predefined and, in certain embodiments, adjusted by the operator via I/O device 130. If the current road load remains above the nominal road load by more than, for example, ten percent for more than the preset distance and/or time, the vehicle cruise control management module 155 may selectively adjust one of the cruise droop characteristics. In this example, the module 155 may lower (decay) the upper breakpoint to 703, such that the vehicle may be allowed to regress in speed. The upper breakpoint 703 may decay to match or coincide with the current road load. Accordingly, the upper droop is activated nearly instantaneously upon making the adjustment. In another example, if the current road load remains below the nominal road by more than ten percent (preset acceptable deviation amount) for more than the preset distance and/or time, the module 155 may decay the lower droop breakpoint to 704 to allow the vehicle to increase in speed. These two examples depict adjustments to the cruise control droop breakpoints based on the current road load being outside an acceptable deviation of the nominal road. In each case, the upper/lower droop breakpoint is adjusted to coincide with that current road load. In other example adjustments, the module 155 may also, or only, adjust the upper and lower droop slopes 705, 706 and the droop speed decrease and increase amounts 707, 708. For example, the droop slope may be decreased (flattened) to ease the increase/decrease of vehicle speed to ease drivability.

The module 155 may also be structured to make the adjustment to substantially match the increase or decrease in road load. For example, if the road load is decreasing by X percent-per-second, the module 155 may decrease (decay) the lower droop breakpoint by X percent-per-second while also adjusting the lower droop slope to coincide with that rate. In this case, the transition to the lower droop (vehicle speed increase) may be relatively smoother.

As mentioned above, the module 155 may further be structured to make the adjustment based on a comparison of the current road load to one or more predefined cruise droop characteristics (e.g., upper and lower cruise droop breakpoints 701, 702). This determination may be based on the current road (for at least one of a predetermined amount of time and distance) being within a predefined percentage, amount, deviation, and the like of the upper or lower cruise droop breakpoint. For example, the current road load may be ten percent below the upper droop breakpoint. The module 155 may lower (decay) the upper breakpoint to coincide with the determined current road load. In another example, the current road load may be above the upper droop breakpoint for a preset amount time. The module 155 may grow the upper droop breakpoint to prevent activation of the upper droop. The module 155 may make this adjustment based on an operator preference of minimizing trip time, which in turn causes the module 155 to substantially prevent vehicle speed slowdowns.

As such, in certain embodiments, the adjustments may be constrained by one or more preferences of the operator, wherein the preferences are received from the operator interface module 160. These preferences may include, but are not limited to, minimizing fuel consumption, minimizing trip time, minimizing gear shift events, etc. If the operator desires to minimize fuel consumption, the module 155 may readily decay the upper droop break point. In this case, the vehicle is permitted to decrease speed sooner without additional power expenditures, which reduces fuel consumption. If a downhill grade, the module 155 may decay the lower breakpoint to permit the vehicle to exceed its set speed relatively sooner thereby accumulating additional momentum and saving fuel later on. However, if the operator desires to minimize trip time, the upper breakpoint may be increased while the lower breakpoint may be decayed. The lower droop amount may also be increased. In this case, the module 155 substantially prevents the vehicle from regressing speed while permitting the vehicle to increase speed and the speed amount. In turn, the operator may decrease travel time. Gear shift events may lead to unpleasant drivability experienced by the operator (e.g., a moment of no power while the shift occurs). Accordingly, an operator may prefer to minimize these events while in cruise control. In turn, the vehicle cruise control management module 155 may reduce vehicle droop speed amount increases/decreases to stay at the gear that the vehicle was in when the cruise control period was initiated. In other embodiments, in addition to road load, the history module 157 may track the gears (transmission settings) encountered during the cruise control period and make determinations relative to the nominal transmission setting to minimize gear shift events. Although only a few example operator preference implementations are described above in regard to dynamically controlling the cruise droop characteristics, many other preferences and operational implementations are possible with all such possibilities intended to be within the scope of this disclosure.

In one embodiment, the adjustment may be for fuel conservation. Accordingly, the fuel conservation adjustment may include increasing the upper droop amount (allow vehicle speed decrease amount relative to the cruise set speed on an uphill portion) for better fuel economy as long as the vehicle does not lug back on the uphill or gain too much speed on the downhill. The fuel conservation adjustment may also include decaying the upper droop breakpoint. The fuel conservation adjustment may further include increasing the bottom droop amount (allowed vehicle speed increase amount relative to the cruise set speed on a downhill portion) for better fuel economy and to decrease trip time. In one example embodiment, the upper and bottom droop amount is 5 MPH relative to the cruise set speed while the decayed amount of the upper droop breakpoint is eighty percent of the default upper droop breakpoint. Generally speaking, these adjustments are configured to increase fuel economy for the vehicle.

Using the aforementioned, an example operation of the modules described above may be as follows. An operator sets a cruise control set speed of 60 MPH, which the powertrain management module 159 implements with the vehicle 100. For the past ten minutes (the duration of the cruise control period at 60 MPH), the load determination module 156 has been making road load determinations, which are being tracked and maintained by the history module 157. The nominal operation module 158 is simultaneously determining a nominal road load for this period of operation. At some point in the future, the load determination module 156 determines a road load in excess of the nominal road by more than an acceptable amount. The vehicle cruise control management module 155 then determines that this road load is being experienced for more than thirty seconds (the preset time). To initiate vehicle speed regression, the vehicle cruise control management module 155 decays the upper breakpoint. At which point, when the current road load coincides with this breakpoint, the powertrain management module 159 reduces the fueling and otherwise slows the vehicle down within the maximum allowed speed regression. In this case, the module 155 is making the cruise control droop characteristic adjustment to conserve fuel (i.e., reducing the power expenditure to allow the vehicle to regress in speed relative to the set speed).

The aforementioned description describes how the controller 150 makes cruise droop adjustments based on the past (history) and present road loads. In certain embodiments, the controller 150 may adjust one or more cruise droop characteristics based on the past, present, and predicted road loads.

Figure 8:
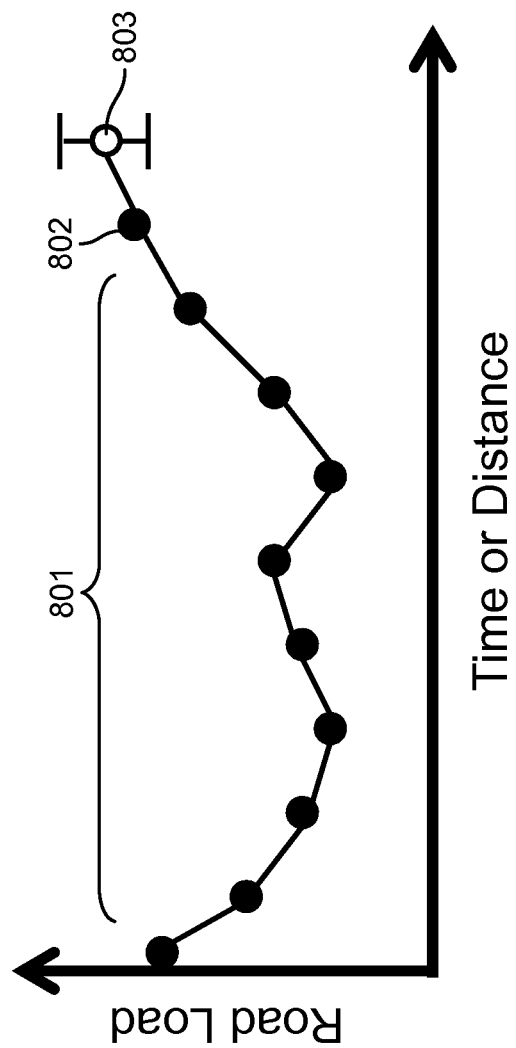
FIG. 8 is a schematic depicting a projected future road load for a vehicle based on a history of operating bands and a current determined operating band, according to an example embodiment.

Accordingly, the projection module 161 is structured to project a next road load for the vehicle based on the history of determined road loads. The projection may be based on a projected road load trend, a grade projection, and any other projection that provides an indication of the road load at a future location or distance. Based on the history of determined road loads and the current road load, the projection module 161 may use an extrapolation function, a correlation function, a model, a forecasting application, an algorithm, and any other process to predict the road load at a future location or time. FIG. 8 depicts a history of determined road loads (portion 801), a current road load (802), and a predicted future road load (803). The predicted or projected road load may be provided to the vehicle cruise control management module 155. The vehicle cruise control management module 155 compares the projected road load to at least one of preset cruise droop settings (e.g., upper and lower droop breakpoints) and a nominal road load as determined by the nominal operation module 158. If the projected road load is outside an acceptable deviation, the vehicle cruise control management module 155 adjusts one or more cruise control droop characteristics (described above). Therefore, the projection module 161 enables cruise droop control based on predicted future road loads without the use of relatively costly technology that provides grade information (i.e., global positioning system data that provides altitude and curvature data) to estimate the upcoming road load on the vehicle. In turn, the controller 150 includes a modularity aspect that may make it appealing to many vehicle operators.

In some embodiments, the vehicle cruise control management module 155 is structured to adjust one or more cruise control droop characteristics based on past, present, and (in certain embodiments) road load, wherein the determined road load is a function of vehicle mass. This allows the droop to be active at different points for lightly or heavily loaded vehicles. In this case, $P_{Gravity}$ is calculated based on the vehicle mass. In other embodiments described above herein, the road load may exclude this term due to the vehicle potentially routinely varying in its mass (e.g., a semi-tractor trailer may be fully loaded, partially loaded, or have no load and the type of loads may vary (e.g., steel rods versus stuffed animals)). In these latter cases, the $P_{Gravity}$ (or any other term used to estimate vehicle mass to determine road load) may be excluded from the determinations, provided with an estimate, or the road load may be determined using other methods than those described above.

However, by including a real-time determination of vehicle mass, a form of gain scheduling (adjustments based on vehicle mass) is provided to enable the same droop (e.g., upper droop and bottom droop) for a relatively lighter vehicle as in a relatively heavier vehicle for the same grade. In turn, operators may experience the same type of cruise control performance (i.e., drivability), regardless of the vehicle mass. For example, without gain scheduling based on vehicle mass, a heavier vehicle does more slowing down than a lighter vehicle on a steeper grade. In turn, the lighter vehicle maintains a relatively faster vehicle speed which results in a relatively shorter trip time. When the load determination module 156 uses vehicle mass to determine road load, the vehicle cruise control management module 155 may substantially ameliorate any differences in cruise control droop characteristics between the heavy and light vehicles. Accordingly, if the operator prefers the cruise control operability of the heavier vehicle, the module 156 may adjust the no-loaded vehicle droop characteristics to achieve substantially the same feel for the operator.

As mentioned above, utilization of vehicle mass may be included in either using the past and present road loads to adjust cruise control droop characteristics and in using the past, present, and projected future road loads to adjust cruise control droop characteristics.

Figure 9:
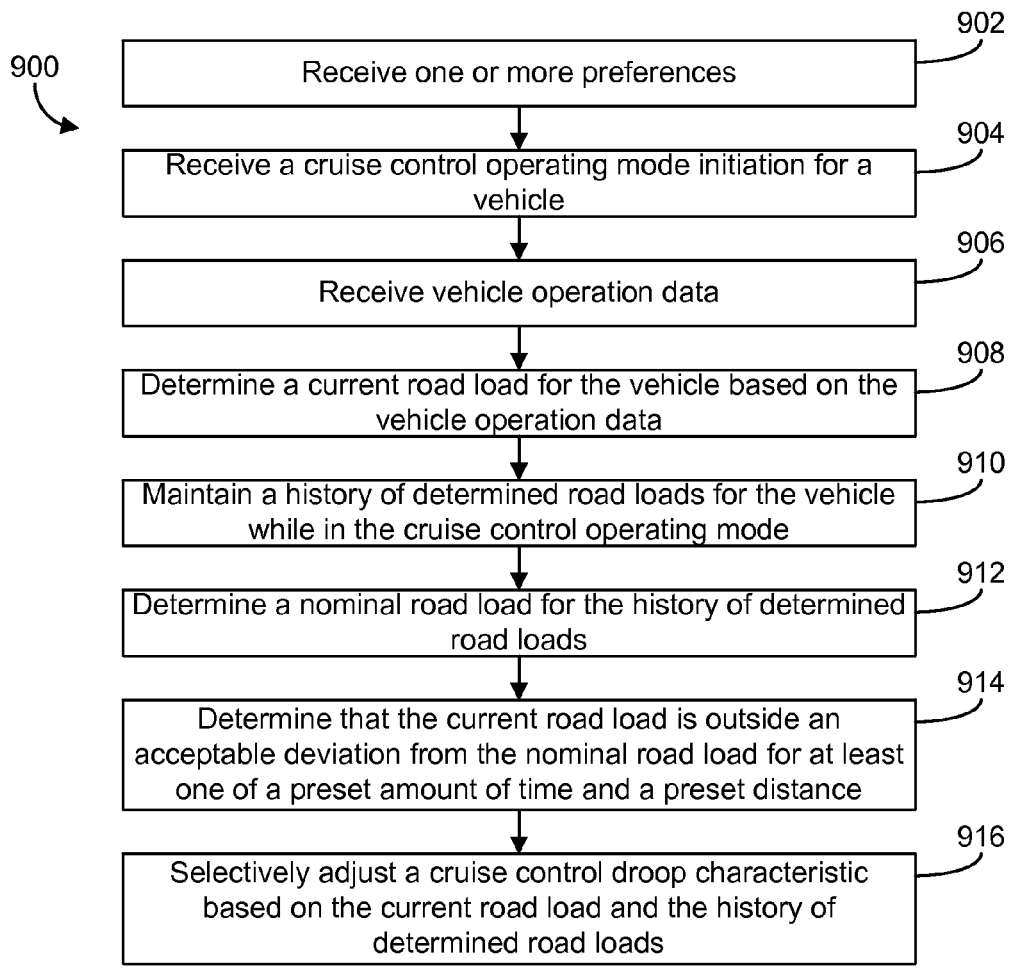
FIG. 9 is a flowchart of a method of dynamically controlling one or more cruise control droop characteristics, according to an example embodiment.

Referring now to FIG. 9, a method 900 of dynamically controlling one or more cruise control droop characteristics is shown according to an example embodiment. Method 900 corresponds with the controller 150 using past and present road loads to affect cruise control droop characteristics. In one example embodiment, method 900 may be implemented with the controller 150 of FIGS. 1-2. Accordingly, method 900 may be described in regard to FIGS. 1-2.

At process 902, the controller 150 receives one or more preferences. As mentioned above, the preferences may include, but are not limited to, minimizing fuel consumption, minimizing trip time, minimizing gear shift events, etc. In certain embodiments, the controller 150 uses the preferences to further constrain/adjust the one or more cruise droop characteristics. At process 904, a cruise control operating mode initiation is received for a vehicle. The cruise control initiation may also include a cruise control vehicle set speed. Both of these inputs may be received via the operator I/O device 130. Process 904 may correspond with the start of the history of determined road loads (process 910 below). Vehicle operation data is received (process 906). The vehicle operation data may include engine speed, engine torque, and any other data point (or vehicle parameter, described above) that the controller 150 uses to determine road loads for the vehicle (process 908). As mentioned above, in some embodiments, the vehicle mass may be included in this determination thereby allowing the controller 150 to adjust the droop characteristics based at least partly on the vehicle's mass. While in the cruise control operating mode, the controller 150 maintains a history of determined road loads for the vehicle (process 910). The history may correspond with a cruise control session (e.g., from cruise control activation to deactivation) or variations thereof. For example, as mentioned above, the history may correspond to a route of the vehicle, which was previously travelled. Additionally, the cruise control session may include brief (less than a preset amount of time or distance) deactivations prior to re-activation.

In certain embodiments, a nominal road load based on the history of determined road loads is determined (process 912). As mentioned above, the nominal road load includes an average, a median, and any other representative road load for the history of determined road loads. The controller 150 then determines that the current road load is outside an acceptable deviation from the nominal road load (process 914). The determination that the current road load is outside an acceptable deviation from the nominal road load is based on the current road load being outside the acceptable deviation for at least one of a preset amount of time and a preset distance. Thus, excursions above and below the nominal road load—in excess of the acceptable deviation amount—are substantially excluded from impacting the cruise control droop adjustment.

At process 916, the controller 150 selectively adjusts a cruise control droop characteristics based on the current road load and the history of determined road loads. As mentioned above, the adjustment may include decay/growth of the upper and/or lower droop breakpoints, increase or decrease of the upper and lower droop slopes, and/or increase or decrease of droop speed amounts. The adjustments may be based on where the current road load is relative to the nominal road load. For example, if the current road load is near the predefined bottom droop breakpoint (outside the acceptable deviation amount) but not at that point, the controller 150 may decay the bottom droop breakpoint to coincide with the current road load to permit the droop speed increase. Additionally, the adjustment may be based on one or more operator preferences. For example, the operator may have inputted a preference of minimizing fuel economy such that the controller 150, based on the current road load, decays the upper droop breakpoint to permit a vehicle speed decrease to occur relatively sooner.

Although described above (process 914) based on a nominal road load, in some embodiments, the controller may determine to make an adjustment to a cruise control droop characteristic based on the current road load relative to a predefined cruise control droop characteristic. For example, if the current road load has been below the predefined upper droop breakpoint based on the cruise control set speed for a preset amount of time by a preset amount, the controller 150 may decay the upper droop breakpoint to coincide with the determined current road load.

In some embodiments, as mentioned above, the road load determinations may be based on the vehicle's mass. Accordingly, the cruise control droop adjustments take into consideration the vehicle's mass and enable the controller 150 effect cruise control droop characteristics that may substantially correlate with an operator experiencing similar cruise control effects whether the vehicle is loaded or not loaded (based on a semi-tractor trailer vehicle).

Figure 10:
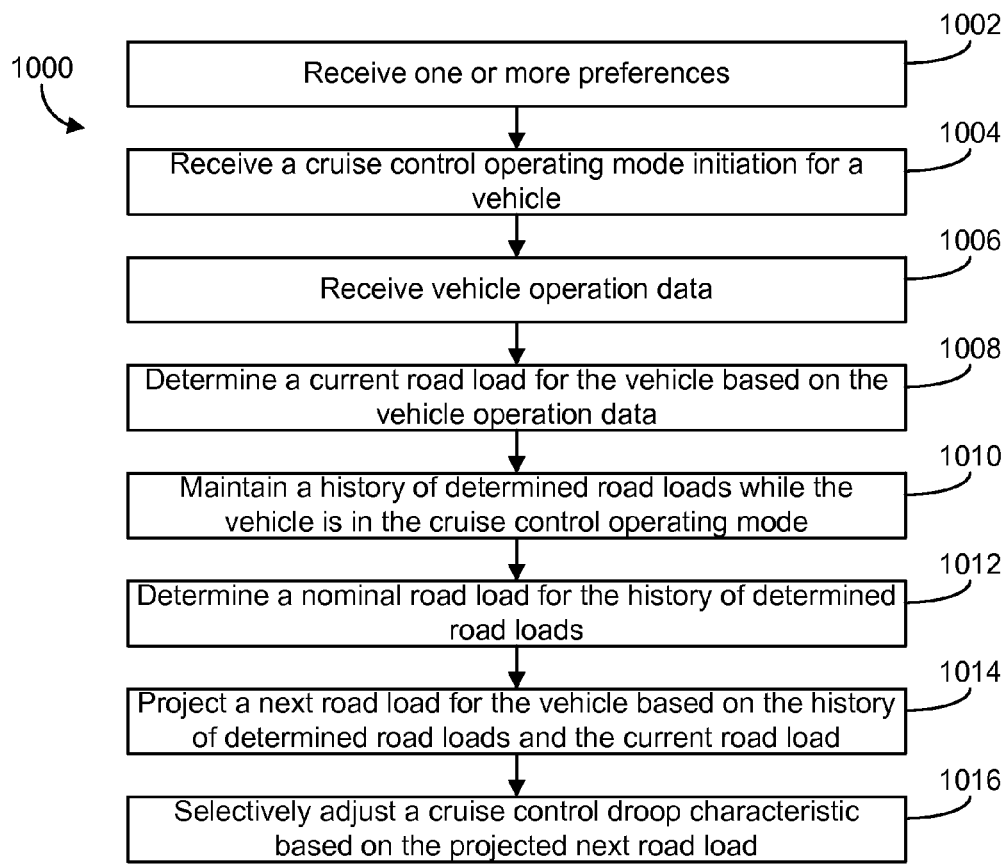
FIG. 10 is a flowchart of a method of dynamically controlling one or more cruise control droop characteristics based on a projected future road load, according to an example embodiment.

Referring now to FIG. 10, a method 1000 of dynamically controlling one or more cruise control droop characteristics is shown according to an example embodiment. Method 1000 corresponds with the controller 150 using past, present, and projected future road loads to adjust a cruise control droop characteristic. In one example embodiment, method 1000 may be implemented with the controller 150 of FIGS. 1-2. Accordingly, method 1000 may be described in regard to FIGS. 1-2.

Processes 1002-1012 correspond with processes 902-914, with their description located above. As compared to method 900, at process 1014, a future or projected road load of the vehicle is determined based on the history of determined road loads and the current road load. In other embodiments, the determination may only take into account the history of determined road loads and not the current road load. In one embodiment, the projected road is determined for at least one of a next unit distance and a next unit of time. The unit of distance and time may be predefined in the controller 150. For example, the controller may determine road loads every quarter-mile, such that the projected next road load is at a location a quarter-mile in front of the vehicle's current location. In other embodiments, the projection may be further out (i.e., a location or time event further than then next unit distance or unit time). As mentioned above, the projection may be based on a projected road load trend or any other projection that provides an indication of the road load at a future location using any method including, but not limited to, an extrapolation function, a correlation function, a model, a forecasting application, an algorithm, and any other process that predicts the road load at a future location or time. According to one example embodiment, the projection is only based on the current and history of determined road loads for the vehicle cruise control session. As such, technology that provides an indication of an upcoming grade—to determine road load—is not needed.

Based on the projected road load, the controller 150 selectively adjusts a cruise control droop characteristic (process 1016). In certain embodiments, the adjustment may be based on a comparison between the projected road load and a nominal road load (process 1012). For example, if the projected road load is outside an acceptable deviation relative to the nominal road load, the controller 150 adjusts a cruise control droop characteristic. This adjustment may also be based on where the projected road load is relative to the nominal road load (e.g., relatively closer to the upper droop breakpoint or the lower droop breakpoint). In other embodiments, the adjustment may be based on the projected road load relative to a predefined upper or lower droop breakpoint. The predefined upper and lower droop breakpoints may be based on the cruise control set speed. The controller 150 may determine that the projected road load is within a predefined amount of the breakpoints and command an adjustment. In still other embodiments, the adjustment may be based on the projected road compared to the history of determined road loads and the current road load.

In some embodiments as with method 900, method 1000 may also utilize vehicle mass to determine and project road loads. Accordingly, cruise control droop adjustments (process 1016) may be based on a vehicle's mass.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

Example and non-limiting module implementation elements include sensors (e.g., sensors 140) providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine-readable medium for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in machine-readable medium (or computer-readable medium), the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus, comprising:
   an operator interface module structured to receive an input, the input including a cruise control operating mode initiation for the vehicle;
   a load determination module structured to determine a road load for the vehicle while the vehicle is in the cruise control operating mode;
   a history module structured to maintain a history of the determined road loads;
   a projection module structured to project a next road load for the vehicle based on the history of determined road loads and a current road load; and
   a vehicle cruise control management module structured to selectively adjust a cruise control droop characteristic based on the current road load and the history of determined road loads.

2. The apparatus of claim 1, wherein the adjustment includes a fuel conservation adjustment, the fuel conservation adjustment including at least one of an increase in an upper droop amount, an increase in a lower droop amount, and a decay of an upper droop breakpoint.

3. The apparatus of claim 1, wherein the vehicle cruise control management module is structured to adjust the cruise control droop characteristic based on the current road load being within a preset deviation of at least one of an upper droop breakpoint and a lower droop breakpoint for at least one of a preset amount of time and a preset distance of travel for the vehicle.

4. The apparatus of claim 1, further comprising a nominal operation module structured to determine a nominal road load for the history of determined road loads, wherein the vehicle cruise control management module is structured to selectively adjust the cruise control droop characteristic based on the current road load being outside an acceptable deviation from the nominal road load.

5. The apparatus of claim 1, wherein the vehicle cruise control management module is structured to selectively adjust the cruise control droop characteristic based on the projected next road load being outside an acceptable deviation from a nominal road load for at least one of a preset amount of time and a preset distance of travel for the vehicle.

6. The apparatus of claim 2, wherein the upper droop amount is 5 miles-per-hour relative to a cruise set speed, the lower droop amount is 5 miles-per-hour relative to the cruise set speed, and the decay of the upper droop breakpoint is eighty percent of a default upper droop breakpoint.

7. An apparatus, comprising:
   an operator interface module structured to receive an input, the input including a cruise control operating mode initiation for the vehicle;
   a load determination module structured to determine a road load for the vehicle while the vehicle is in the cruise control operating mode;
   a history module structured to maintain a history of the determined road loads;
   a nominal operation module structured to determine a nominal road load for the history of determined road loads; and
   a vehicle cruise control management module structured to selectively adjust a cruise control droop characteristic based on a current road load and the history of determined road loads, wherein the vehicle cruise control management module is structured to selectively adjust the cruise control droop characteristic based on the current road load being outside an acceptable deviation from the nominal road load.

8. An apparatus, comprising:
   an operator interface module structured to receive an input, the input including a cruise control operating mode initiation for the vehicle;
   a load determination module structured to determine a road load for the vehicle while the vehicle is in the cruise control operating mode;
   a history module structured to maintain a history of the determined road loads; and
   a vehicle cruise control management module structured to selectively adjust a cruise control droop characteristic based on a current road load and the history of determined road loads;
   wherein the adjustment includes a fuel conservation adjustment, the fuel conservation adjustment including at least one of an increase in an upper droop amount, an increase in a lower droop amount, and a decay of an upper droop breakpoint; and
   wherein the upper droop amount is 5 miles-per-hour relative to a cruise set speed, the lower droop amount is 5 miles-per-hour relative to the cruise set speed, and the decay of the upper droop breakpoint is eighty percent of a default upper droop breakpoint.

9. A method, comprising:
   receiving a cruise control operating mode initiation for a vehicle;
   receiving vehicle operation data;
   determining a current road load for the vehicle based on the vehicle operation data, wherein the current road load provides an indication of a load on the vehicle;
   maintaining a history of determined road loads while the vehicle is in the cruise control operating mode;
   determining a nominal road load for the history of determined road loads;
   determining that the current road load is outside an acceptable deviation from the nominal road load; and selectively adjusting a cruise control droop characteristic based on the current road load and the history of determined road loads.

10. The method of claim 9, wherein the determination that the current road load is outside an acceptable deviation from the nominal road load is based on the current road load being outside the acceptable deviation for at least one of a preset amount of time and a preset distance.

11. The method of claim 9, wherein the adjustment is based on the current road load being within a preset deviation of at least one of an upper droop breakpoint and a lower droop breakpoint for at least one of a preset amount of time and a preset distance of travel for the vehicle.

12. The method of claim 9, wherein the adjustment is structured to match at least one of an upper droop breakpoint and a lower droop breakpoint with the current road load.

13. The method of claim 9, wherein at least one of a maximum upper droop slope and a maximum lower droop slope are selectively adjusted to match at least one of a rate of increase and decrease of road load.

14. The method of claim 9, wherein the adjustment is confined by one or more cruise control droop settings, the one or more cruise control droop settings including a maximum upper droop slope, a maximum lower droop slope, a maximum upper droop breakpoint decay, and a maximum lower droop breakpoint decay.

15. A method, comprising:
receiving a cruise control operating mode initiation for a vehicle;
receiving vehicle operation data;
determining a current road load for the vehicle based on the vehicle operation data, wherein the current road load provides an indication of a load on the vehicle;
maintaining a history of determined road loads while the vehicle is in the cruise control operating mode;
projecting a next road load for the vehicle based on the history of determined road loads and the current road load; and
selectively adjusting a cruise control droop characteristic based on the projected next road load.

16. The method of claim 15, wherein the adjustment is based on the projected road load being within a preset deviation of at least one of an upper droop breakpoint and a lower droop breakpoint for at least one of a preset amount of time and a preset distance of travel for the vehicle.

17. The method of claim 15, further comprising determining a nominal road load for the history of determined road loads, wherein the nominal road load provides an indication of a representative road load encountered by the vehicle while in the cruise control operating mode.

18. The method of claim 15, wherein the determined road loads and the projected next load is based on a determined mass of the vehicle.

19. The method of claim 17, wherein the adjustment is based on the projected next road load being outside an acceptable deviation from the nominal road load.

20. The method of claim 19, wherein the adjustment is based on the projected next road load being outside the acceptable deviation from the nominal road load for at least one of a preset amount of time and a preset distance of travel for the vehicle.

* * * * *